Patented Feb. 3, 1931

1,790,780

UNITED STATES PATENT OFFICE

KARL WILKE, OF HOCHST-ON-THE-MAIN, GERMANY, ASSIGNOR TO GENERAL ANILINE WORKS, INC., OF NEW YORK, N. Y., A CORPORATION OF DELAWARE

VAT DYESTUFFS OF THE BENZANTHRONE PYRAZOLEANTHRONE SERIES AND PROCESS OF PREPARING THEM

No Drawing. Application filed August 29, 1927, Serial No. 216,338, and in Germany August 30, 1926.

My present invention relates to vat dyestuffs of the benzanthrone-pyrazoleanthrone series and process of preparing them.

I have found that new valuable vat dyestuffs of the benzanthrone-pyrazoleanthrone series are obtained by treating with an alkaline condensing agent an N-benzanthronylpyrazoleanthrone, obtainable for instance from a pyrazoleanthrone and a Bz-1-halogen benzanthrone. These dyestuffs have probably a structure similar to that of the dibenzanthrone, so that the reaction may be illustrated by the following formulae:

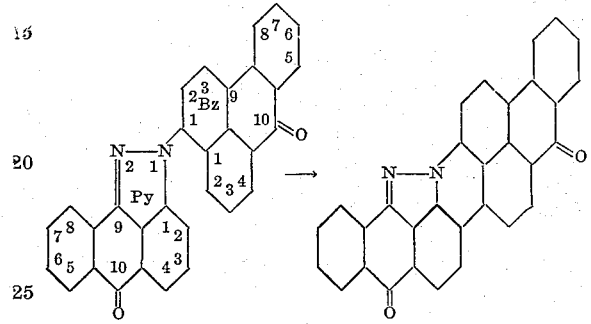

By causing a halogen or a halogenating agent to act upon the dyestuffs, halogenated dyestuffs of the same series are formed which differ from the parent dyestuffs by their reactions and tinctorial properties. The dyestuffs containing halogen are particularly valuable as regards their shade and the enhanced brightness of their dyeings.

The following examples serve to illustrate my invention, but they are not intended to limit it thereto; the parts are parts by weight:

1. 22 parts of pyrazoleanthrone and 31 parts of Bz-1-bromobenzanthrone are stirred for 7 hours at boiling temperature in the presence of 15 parts of potassium carbonate and about 0.5 part of copper carbonate in 300 parts of nitrobenzene. The benzanthronylpyrazoleanthrone which separates on cooling forms, when recrystallized from nitrobenzene, a yellow crystalline powder melting at 398° C. to 400° C. The pure substance dissolves in sulfuric acid to a yellowish-red solution without any fluorescence.

10 parts of the benzanthronylpyrazoleanthrone thus prepared are intimately mixed with 100 parts of pulverized caustic potash, this mixture is soaked with 100 parts of alcohol and heated in the steam bath for 5 to 6 hours at about 90° C. to 100° C. The mass is then dissolved in water, the dissolved leucocompound is oxidized by passing air through the solution and the dyestuff which has separated is filtered and washed. It forms a blackish-blue paste, and in a dry state is a violet-blue powder of a metallic lustre. It is soluble in concentrated sulfuric acid to a dull violet-red solution which changes to green when the solution is carefully diluted with water. On further adding water to the solution blue flakes are separated. The dyestuff gives with alkaline hydrosulfite a greenish-blue vat dyeing cotton fast blue tints.

2. If alkali is caused to act upon benzanthronylpyrazoleanthrone at a higher temperature, another dyestuff is formed, obviously by the way of the product described in Example 1.

Into a melt, heated to 160° C., of 150 parts of caustic potash and 75 parts of alcohol are introduced in an atmosphere of nitrogen 10 parts of benzanthronyl-pyrazoleanthrone, and the whole is stirred at 160° C. for 3 hours. The mixture is then poured into water, and the dyestuff is entirely separated in the form of greenish grey-blue flakes by passing air through the solution. After filtering and washing a black paste is obtained which forms when dried a brownish-black powder. It dissolves in concentrated sulfuric acid to an olive-brown solution which changes to green on addition of a small quantity of water and from which on stronger dilution green flakes are separated. The dyestuff yields with alkaline hydrosulfite a blue vat which dyes cotton greenish-grey to black tints.

3. Bz-2-phenylbenzanthronylpyrazoleanthrone, when condensed as indicated in Example 1, yields a dyestuff dissolving in concentrated sulfuric acid to a violet-red solution. It forms with hydrosulfite a greenish-blue vat which dyes cotton blue tints of a much more greenish hue than the dyeings produced from the non-phenylated benzanthronylpyrazoleanthrone obtainable according to Example 1.

The Bz-2-phenylbenzanthronylpyrazoleanthrone used as starting material can easily be prepared by condensing pyrazoleanthrone with Bz-1-chloro-Bz-2-phenylbenzanthrone of melting point 248° C. It is a yellow crystalline powder melting at 321° C. and dissolving in concentrated sulfuric acid to a red solution with an intense yellow hue and without fluorescence.

4. By condensing 4-methylpyrazoleanthrone (cf. Berichte der Deutschen Chemischen Gesellschaft, vol. 55, page 2162) with Bz-1-bromobenzanthrone an N-Bz-1-benzanthronyl-4-methylpyrazoleanthrone is obtained which when recrystallized from nitrobenzene forms a brownish-yellow powder melting at 332° C. to 333° C.

By condensing this product in alcoholic potash at the temperature of the steam bath as indicated in Example 1, a dyestuff is produced which in the form of its paste is bluish-green, and in dry state is black. It gives a greenish-blue vat with a bluish-green separation on its surface by access of air and dyes cotton beautiful greenish-blue tints.

5. The nitrobenzanthronylpyrazoleanthrone prepared from nitrated Bz-1-bromobenzanthrone of melting point 292° C. (cf. the co-pending U. S. application Ser. No. 117,568 filed June 21, 1926) and pyrazoleanthrone, is a reddish-yellow powder which after a single recrystallization from a large quantity of nitrobenzene melts at 404° C. to 405° C. By reducing this nitro-body with stannous chloride in a mixture of glacial acetic acid and hydrochloric acid, a red amino-benzanthronylpyrazoleanthrone is obtained melting at 417° C.

Both this nitro- and the amino-benzanthronylpyrazoleanthrone yield when melted with alcoholic potash as indicated in Example 1, a dyestuff which constitutes a dark green paste or a black powder. The dyestuff dissolves in concentrated sulfuric acid to a brownish-yellow solution. It gives with hydrosulfite a blue vat with a greyish-blue separation on its surface by access of air which dyes cotton a greyish-green tint which becomes more intense on chlorination.

6. By condensing one molecular proportion of dipyrazoleanthrone (cf. Berichte der Deutschen Chemischen Gesellschaft, vol. 45, page 2246) and 2 molecular proportions of Bz-1-bromobenzanthrone in nitrobenzene in the presence of potassium carbonate and a copper salt, an N-N'-dibenzanthronyldipyrazoleanthrone can easily be made. This body can be recrystallized from a very large quantity of nitrobenzene; it then forms a powder of orange-yellow crystals which do not melt even at 450° C. It dissolves in concentrated sulfuric acid to a reddish-yellow solution.

20 parts of the above-named dibenzanthronyldipyrazoleanthrone are introduced into a melt, heated to about 150° C. to 160° C., prepared from 100 parts of caustic potash and 100 parts of alcohol, and the mixture is stirred at this temperature for three hours. The dyestuff is worked up as usual and is then obtained in the form of a brownish-violet paste and when dried is a dark brown powder dissolving in concentrated sulfuric acid to an olive-green solution. The dyestuff forms in a violet-red alkaline hydrosulfite vat a red leuco-compound which dissolves rather sparingly. It gives on cotton violet-red dyeings which on exposure to the air oxidize to a reddish-blue. The dyestuff has probably the following structural formula:

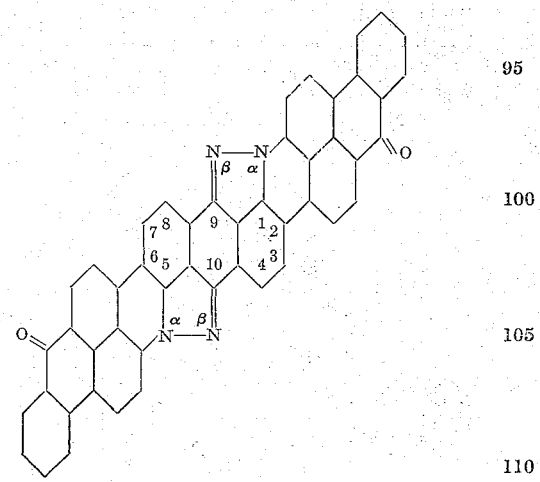

7. To a suspension of 10 parts of the final product of benzanthronepyrazoleanthrone (cf. Example 1) in 100 parts of dry nitrobenzene are added at ordinary temperature 10 parts of sulfuryl-chloride, and the mixture is heated on the water bath to about 70° C. for about 3 hours. After the evolution of hydrochloric acid gas, which at first sets in very strongly, has abated, the mixture is cooled, diluted with alcohol, filtered and washed with alcohol and water. The product dissolves in a large quantity of boiling nitrobenzene to a violet-blue solution from which the chlorinated dyestuff crystallizes in the form of reddish-violet crystals. It forms when dry a dark bluish-violet powder dissolving in sulfuric acid of 66° Bé. to a greyish-violet solution. On careful addition of a small quantity of water the color of this solution changes to green, and on a stronger dilution bright reddish-violet flakes separate. The dyestuff gives with hydrosulfite a greenish-blue vat from which cotton is dyed intense violet-blue shades of excellent properties of fastness. According to the results of analysis it is most probably a dichlorobenzanthronepyrazoleanthrone.

8. Through a suspension of 10 parts of the final product of benzanthronepyrazoleanthrone in 100 parts of nitrobenzene is passed a feeble current of dry chlorine at a temperature of the external bath of 70° C. to 80° C. After about 4 hours the product is worked up as indicated in Example 7; its properties are very similar to those of the product obtainable according to Example 7.

9. Into a solution of the final product of 10 parts of benzanthronepyrazoleanthrone in 100 parts of chlorosulfonic acid to which about 0.05 to 0.10 parts of finely powdered iodine has been added, is introduced a feeble current of chlorine at a temperature of the external bath of about 60° C. After about 3 hours the mixture is poured into ice-water, the dyestuff which is precipitated is filtered, washed and, if necessary, dried. It crystallizes from a large quantity of boiling nitrobenzene in the form of violet crystals. The pure dyestuff is soluble in sulfuric acid of 66° Bé. to a yellowish-olive solution which on addition of some water changes to green. On more highly diluting the solution reddish-violet flakes are precipitated. The dyestuff gives with hydrosulfite a greenish blue vat which dyes cotton a reddish-blue tint. A sparingly soluble leuco-compound easily separates from the vat, which indicates the presence of a highly-chlorinated product. Probably it is a tetrachlorobenzanthronepyrazoleanthrone.

10. 10 parts of the final product of benzanthronepyrazoleanthrone are boiled in a reflux apparatus in 100 parts of glacial acetic acid with 40 parts of bromine until the evolution of hydrogen bromide is finished. After cooling, the mass is filtered, washed and, if necessary, dried. The brominated dyestuff crystallizes from a large quantity of boiling nitrobenzene in the form of bluish-violet crystals. It is soluble in sulfuric acid of 66° Bé. to a greyish-violet solution which, on dilution, first changes to green, and then violet-blue flakes are precipitated. The dyestuff gives a greenish-blue vat which dyes cotton greenish-blue tints. As the analysis shows, the body is a dibromobenzanthronepyrazoleanthrone.

11. A brominated dyestuff which is very similar to that obtained as described in the preceding example is obtained by heating benzanthronepyrazoleanthrone in 10 times its weight of nitrobenzene with the quantity of bromine calculated for the entrance of two molecular proportions, for several hours on the water-bath. The dyestuff, when worked up as usual and recrystallized from a large quantity of nitrobenzene, dissolves in sulfuric acid of 66° Bé. to a reddish-violet solution. It gives a greenish-blue vat which dyes cotton a greenish-blue shade.

I claim:

1. The process of preparing vat dyestuffs of the benzanthrone-pyrazoleanthrone series comprising the steps of treating with an alkaline condensing agent an N-benzanthronyl-pyrazoleanthrone of the following formula:

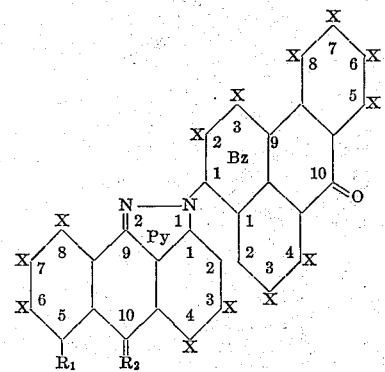

wherein X stands for hydrogen or any substituent, $R_1$ for hydrogen or any substituent and $R_2$ for oxygen or $R_2+R_1$ for the residue

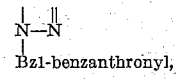

and causing an oxidizing agent to act upon the product so obtained.

2. The process of preparing vat dyestuffs of the benzanthrone-pyrazoleanthrone series comprising the steps of treating with an alkaline condensing agent at temperatures of about 90° C. to 160° C. an N-benzanthronyl-pyrazoleanthrone of the following formula:

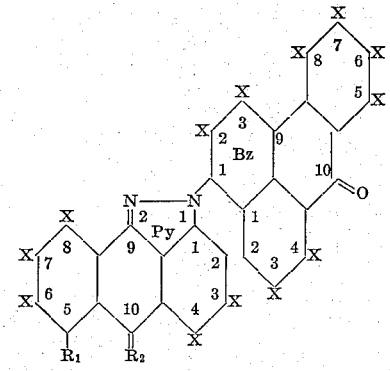

wherein X stands for hydrogen or any substituent, $R_1$ for hydrogen or any substituent and $R_2$ for oxygen or $R_2+R_1$ for the residue

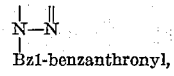

and causing an oxidizing agent to act upon the product so obtained.

3. The process of preparing vat dyestuffs of the benzanthrone-pyrazoleanthrone series comprising the steps of treating with an alkaline condensing agent at a temperature of 90° C. to 100° C. an N-benzanthronyl-pyrazoleanthrone of the following formula:

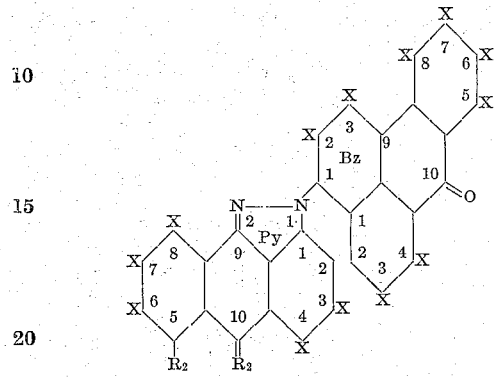

wherein X stands for hydrogen or any substituent, $R_1$ for hydrogen or any substituent and $R_2$ for oxygen or $R_2 + R_1$ for the residue

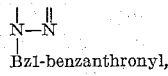

Bz1-benzanthronyl, and causing an oxidizing agent to act upon the product so obtained.

4. The process of preparing vat dyestuffs of the benzanthrone-pyrazoleanthrone series comprising the steps of treating with a mixture of caustic potash and alcohol an N-benzanthronyl-pyrazoleanthrone of the following formula:

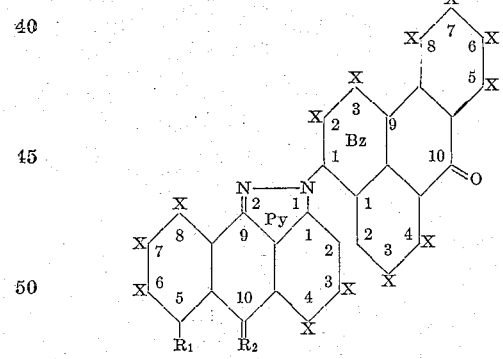

wherein X stands for hydrogen or any substituent, $R_1$ for hydrogen or any substituent and $R_2$ for oxygen or $R_2 + R_1$ for the residue

Bz1-benzanthronyl, and causing air to act upon the product so obtained.

5. The process of preparing vat dyestuffs of the benzanthrone-pyrazoleanthrone series comprising the steps of treating with a mixture of caustic potash and alcohol at temperatures of about 90° C. to 160° C. an N-benzanthronyl-pyrazoleanthrone of the following formula:

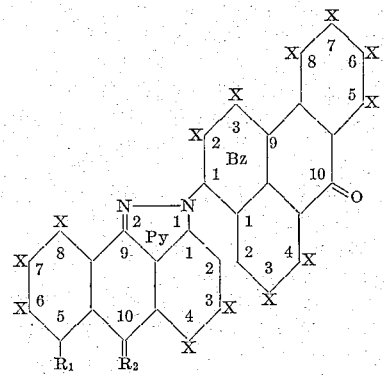

wherein X stands for hydrogen or any substituent, $R_1$ for hydrogen or any substituent and $R_2$ for oxygen or $R_2 + R_1$ for the residue

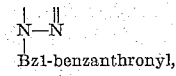

Bz1-benzanthronyl, and causing air to act upon the product so obtained.

6. The process of preparing vat dyestuffs of the benzanthrone-pyrazoleanthrone series comprising the steps of treating with a mixture of caustic potash and alcohol at a temperature of 90° C. to 100° C. an N-benzanthronyl-pyrazoleanthrone of the following formula:

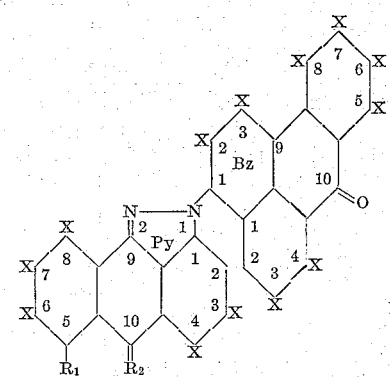

wherein X stands for hydrogen or any substituent, $R_1$ for hydrogen or any substituent and $R_2$ for oxygen or $R_2 + R_1$ for the residue

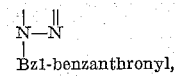

Bz1-benzanthronyl, and causing air to act upon the product so obtained.

7. The process of preparing vat dyestuffs of the benzanthrone-pyrazoleanthrone series by treating N-benzanthronyl-pyrazoleanthrone with an alkaline condensing agent and causing an oxidizing agent to act upon the product so obtained.

8. The process of preparing vat dyestuffs of the benzanthrone-pyrazoleanthrone series by treating N-benzanthronyl-pyrazoleanthrone at temperatures of about 90° C. to 160° C. with an alkaline condensing agent and causing an oxidizing agent to act upon the product so obtained.

9. The process of preparing vat dyestuffs of the benzanthrone-pyrazoleanthrone series by treating N-benzanthronyl-pyrazoleanthrone at a temperature of 90° C. to 100° C. with an alkaline condensing agent and causing an oxidizing agent to act upon the product so obtained.

10. The process of preparing a vat dyestuff of the benzanthrone-pyrazoleanthrone series by treating N-benzanthronyl-pyrazoleanthrone with a mixture of caustic potash and alcohol and causing air to act upon the product so obtained.

11. The process of preparing a vat dyestuff of the benzanthrone-pyrazoleanthrone series by treating N-benzanthronyl-pyrazoleanthrone at temperatures of about 90° C. to 160° C. with a mixture of caustic potash and alcohol and causing air to act upon the product so obtained.

12. The process of preparing a vat dyestuff of the benzanthrone-pyrazoleanthrone series by treating N-benzanthronyl-pyrazoleanthrone at a temperature of 90° C. to 100° C. with a mixture of caustic potash and alcohol and causing air to act upon the product so obtained.

13. As a new product, the vat dyestuff of the following formula:

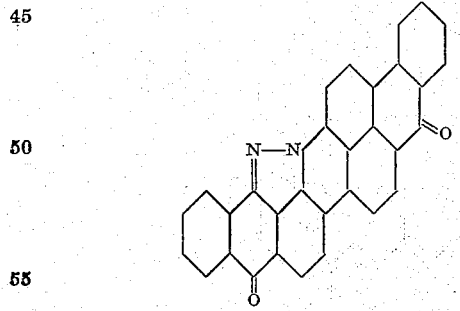

being soluble in concentrated sulfuric acid to a violet-red solution which on addition of water changes first to green and then separates blue flakes and yielding with hydrosulfite a greenish-blue vat from which cotton is dyed fast blue tints.

14. As new products, vat dyestuffs of the benzanthrone-pyrazoleanthrone series of the following formula:

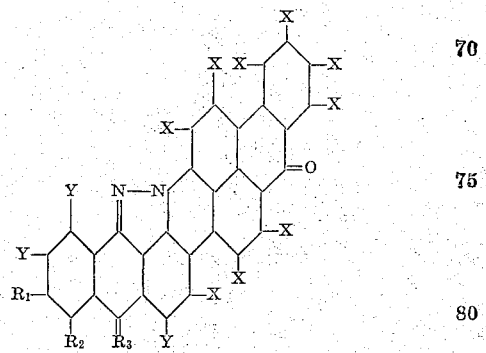

wherein X stands for hydrogen or any substituent, Y stands for hydrogen or any substituent, $R_1$ and $R_2$ stand for hydrogen or any substituent, $R_3$ stands for oxygen or $R_1$, $R_2$ and $R_3$ together stand for the residue

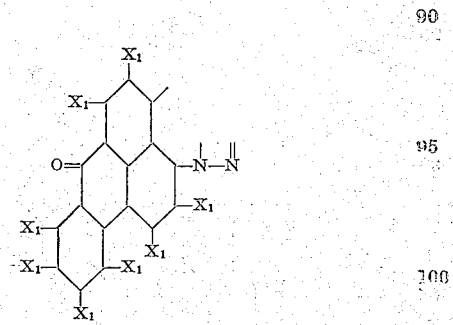

wherein $X_1$ stands for the same substituent, represented by X, the said dyestuffs dyeing cotton from the vat in most cases bluish shades.

15. As new products, vat dyestuffs of the benzanthrone-pyrazoleanthrone series of the following formula:

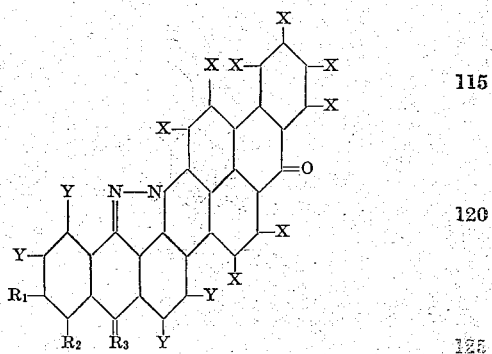

wherein X stands for hydrogen or halogen, Y stands for hydrogen or halogen, $R_1$ and $R_2$ stand for hydrogen or halogen, $R_3$ stands for oxygen or $R_1$, $R_2$ and $R_3$ together stand for the residue

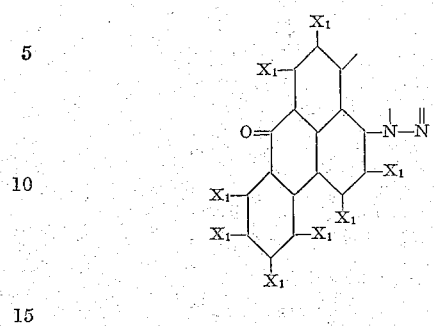

wherein $X_1$ stands for the same substituent, represented by X, the said dyestuffs dyeing cotton from the vat in most cases bluish shades.

16. As new products, vat dyestuffs of the benzanthrone-pyrazoleanthrone series of the following formula:

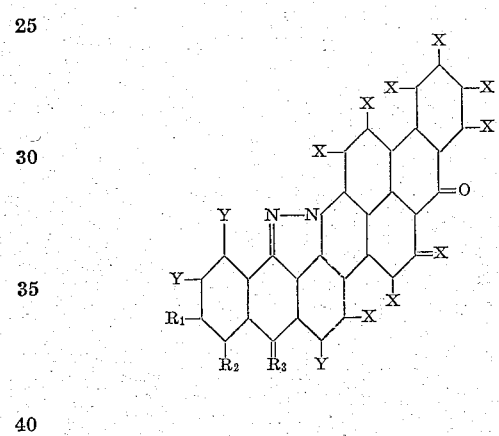

wherein two of the types X, Y, $R_1$ and $R_2$ stand for hydrogen or halogen and the others stand for hydrogen, $R_3$ stands for oxygen or $R_1$, $R_2$ and $R_3$ together stand for the residue:

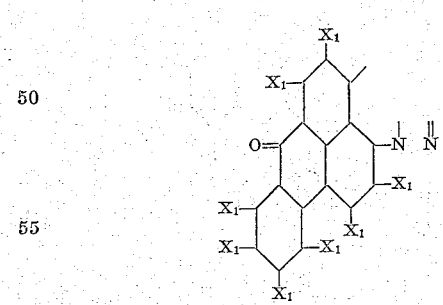

wherein $X_1$ stands for the same substituent, represented by X, the said dyestuffs dyeing cotton from the vat in most cases bluish shades.

17. As new products, vat dyestuffs of the benzanthrone-pyrazoleanthrone series of the following formula:

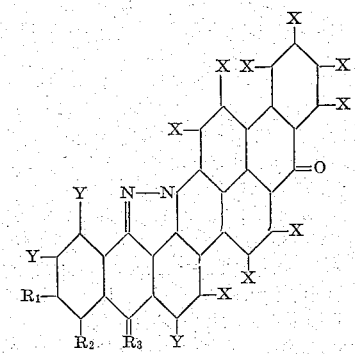

wherein two of the types X, Y, $R_1$ and $R_2$ stand for hydrogen or chlorine and the others stand for hydrogen, $R_3$ stands for oxygen or $R_1$, $R_2$ and $R_3$ together stand for the residue:

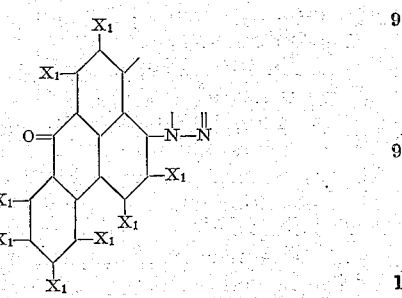

wherein $X_1$ stands for the same substituent, represented by X, the said dyestuffs dyeing cotton from the vat in most cases bluish shades.

18. As new products, vat dyestuffs of the benzanthrone-pyrazolanthrone series of the following formula:

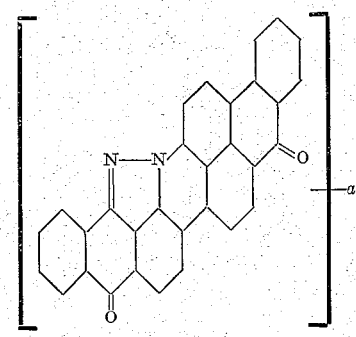

wherein $a$ represents hydrogen or halogen and $n$ stands for one of the numbers 1 to 4, the said dyestuffs dyeing cotton from the vat bluish shades.

19. As new products, vat dyestuffs of the benzanthrone-pyrazolanthrone series of the following general formula:

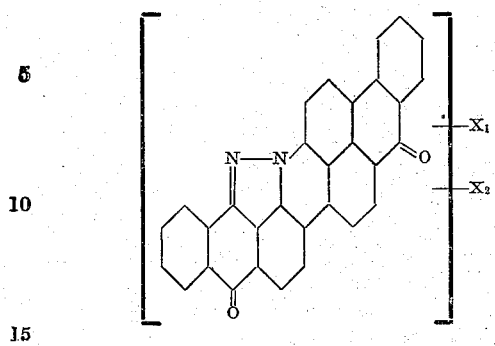

wherein $X_1$ and $X_2$ represent hydrogen or halogen, the said dyestuffs dyeing cotton from the vat bluish shades.

20. As new products, vat dyestuffs of the benzanthrone-pyrazolanthrone series of the following formula:

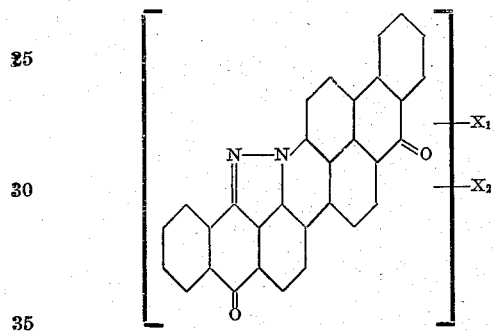

wherein $X_1$ and $X_2$ represent identical or different substituents of the group consisting of hydrogen, chlorine and bromine, the said dyestuffs dyeing cotton from the vat bluish shades.

21. As a new product, the vat dyestuff of the following formula:

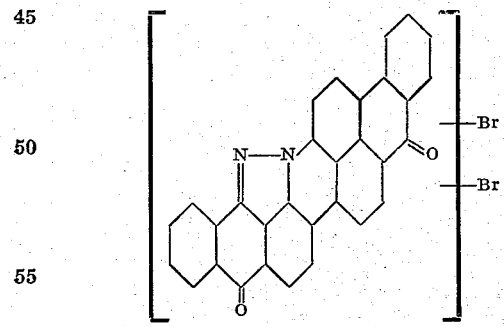

being soluble in concentrated sulfuric acid to a greyish-violet solution which, on addition of water, first changes to green and then separates to violet-blue flakes, and yielding with hydrosulfite in alkaline solution a greenish-blue vat from which cotton is dyed greenish-blue tints.

22. As a new product, the vat dyestuff of the following formula:

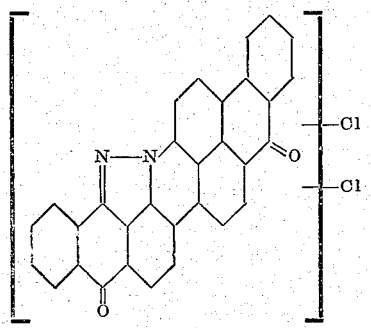

being soluble in concentrated sulfuric acid to a greyish-violet solution which, on careful addition of a small quantity of water, changes to green and on further dilution separates reddish-violet flakes, and yielding with hydrosulfite in alkaline solution a greenish-blue vat from which cotton is dyed intense violet-blue shades of good fastness.

In testimony whereof, I affix my signature.

KARL WILKE.